United States Patent [19]
Oszajca et al.

[11] Patent Number: 6,079,281
[45] Date of Patent: Jun. 27, 2000

[54] SINGLE-JET LIQUID METER WITH IMPROVED DRIVING TORQUE

[75] Inventors: Henri Oszajca, Macon, France; Charles Brunson, Tallassee, Ala.

[73] Assignee: Schlumberger Industries, S.A., Montrouge, France

[21] Appl. No.: 09/012,316

[22] Filed: Jan. 23, 1998

[51] Int. Cl.[7] ........................................ G01F 1/05
[52] U.S. Cl. ........................... 73/861.79; 73/861.87; 73/861.88
[58] Field of Search ................ 73/861.79, 861.87, 73/861.88, 275, 189

[56] References Cited

U.S. PATENT DOCUMENTS

| | | | |
|---|---|---|---|
| 972,200 | 10/1910 | Koelblen | 73/861.88 |
| 1,558,532 | 10/1925 | Chesler | 73/861.88 |
| 3,187,191 | 6/1965 | Baggs | 73/861.87 |
| 4,512,201 | 4/1985 | Konrad et al. | 73/861.79 |

*Primary Examiner*—Harshad Patel
*Attorney, Agent, or Firm*—Leonard W. Pojunas

[57] ABSTRACT

A single-jet liquid meter comprises a body in which a measurement chamber of substantially cylindrical shape is disposed. The chamber is fitted with a spinner having a longitudinal axis XX' and provided with blades, a liquid feed tube and a liquid discharge tube connected to the body and in alignment on an axis YY' that intersects axis XX' perpendicularly. A housing is disposed in the body around the periphery of the spinner and includes at least two slots respectively facing the feed tube and the discharge tube. The slots are designed to inject and eject the liquid flow in an inclined manner relative to the alignment axis of the tubes. At least one slot faces the feed tube and presents, to the flow of liquid coming from said tube, a shaped surface that progressively increases the speed of the flow.

22 Claims, 7 Drawing Sheets

SINGLE-JET LIQUID METER WITH IMPROVED DRIVING TORQUE

The invention relates to a single-jet liquid meter comprising a body in which a measurement chamber of substantially cylindrical shape is disposed, the chamber being fitted with a spinner having a longitudinal axis XX' and provided with blades, a liquid feed tube and a liquid discharge tube connected to said body and in alignment on an axis that intersects said axis XX' perpendicularly, a housing disposed in said body around the periphery of the spinner and including at least two slots respectively placed facing the feed tube and the discharge tube, said slots being designed to inject and eject the liquid flow in inclined manner relative to the alignment axis of the tubes.

BACKGROUND OF THE INVENTION

Single-jet liquid meters generally comprise a body within which there is a measurement chamber of substantially cylindrical shape and equipped with a spinner rotating about a longitudinal axis and provided with a plurality of blades. The body of the meter is connected to two tubes, one for feeding liquid into the measurement chamber and another for discharging it from the chamber.

There exist meters in which the tubes are aligned with each other but are offset, i.e. their alignment axis does not intersect the longitudinal axis. This disposition of the tubes is disadvantageous given that it makes such meters difficult to install in meter premises where space is often at a premium.

There exist meters in which the tubes are likewise offset relative to the longitudinal axis of the spinner, but which are inclined symmetrically relative to said spinner instead of being in alignment with each other. Such meters require the inclination of the tubes to be modified when there is a change in length of the meter.

Finally, as shown in FIG. 1, there exist meters 2 in which the liquid feed tube 4 and the liquid discharge tube 6 are in alignment with each other and whose alignment axis YY' intersects the longitudinal axis XX' of the spinner 8 perpendicularly.

In this type of meter, provision is made to install a housing 10 inside the body, around the periphery of the spinner 8, which housing is known as an "injection box" and is generally made of plastics material. This housing has two slots 12 and 14 placed respectively facing the liquid feed tube 4 and the liquid discharge tube 6. The slots 12 and 14 are inclined symmetrically relative to the tube alignment axis respectively to bring the liquid flow to the periphery of the spinner and to discharge said flow from the periphery of the spinner.

When the spinner of such a meter is rotated by the liquid flowing through the measurement chamber, it transmits this rotary motion to a totalizer, either by means of a magnetic drive system or else mechanically via a gear train.

Because of their weight and their repulsion or attraction forces, the magnets of a magnetic drive system put a mechanical torque on the meter that opposes any setting into motion of the spinner, particularly at low flow rates. This has the consequence of increasing the error in the accuracy of measurements performed by the meter at low flow rates.

To solve this problem attempts may be made to increase the number of spinner blades or to increase the number of radial ribs disposed on the bottom and/or the top portion of the measurement chamber, or indeed to dispose a plurality of slots in the housing in association with each of the tubes. However, that does not reduce the error in the accuracy of measurements performed by the meter at low flow rates.

OBJECTS AND SUMMARY OF THE INVENTION

The Applicant has observed that it would be advantageous to design a single-jet liquid meter that enables error on measurement accuracy at low flow rates to be reduced when said meter is fitted with a magnetic drive system, and to obtain a clear improvement in measurement accuracy over at least a large portion of the range of flow rates to be metered, when the meter has mechanical drive.

The present invention thus provides a single-jet liquid meter comprising: a body in which a measurement chamber of substantially cylindrical shape is disposed, the chamber being fitted with a spinner having a longitudinal axis XX' and provided with blades, a liquid feed tube and a liquid discharge tube connected to said body and in alignment on an axis YY' that intersects said axis XX' perpendicularly, a housing disposed in said body around the periphery of the spinner and including at least two slots respectively placed facing the feed tube and the discharge tube, said slots being designed to inject and eject the liquid flow in inclined manner relative to the alignment axis of the tubes, wherein at least one slot is placed facing the feed tube and offers to the flow of liquid coming from said tube a shaped surface that progressively increases the speed of said flow.

According to a characteristic of the invention, the profile of the surface is mainly constituted by two curves having oppositely-directed concave sides. The curved portion closer to the feed tube is concave. For reasons of simplicity, it is preferable for the slots to have a local flow passage that is rectangular, with the larger dimension thereof extending parallel to the longitudinal axis XX'.

According to a characteristic of the invention, the shaped surface belongs to a first wall of the slot which is situated facing the feed tube, with a second wall of said slot facing the first wall and guiding the flow of liquid progressively accelerated by said shaped surface. The second wall may present a profile that is substantially rectilinear in projection on a plane perpendicular to the longitudinal axis XX'. It should be observed that the second wall may also present a profile that is concave in projection on a plane perpendicular to the longitudinal axis XX'.

When the slot has a rectangular flow section, the dimension of the slot that extends perpendicularly to the longitudinal axis XX' in a plane perpendicular to the alignment axis YY' of the tubes is greater in size than the inside diameter of the feed tube in its portion closest to said tube.

More precisely, in an embodiment of the invention, the curved portion that is closer to the feed tube presents a circular profile C1 in projection on a plane perpendicular to the longitudinal axis XX'. The curved portion of concave side that is oppositely directed to the portion that is closer to the feed tube presents a circular profile C2 of larger radius than C1 in projection on a plane perpendicular to the longitudinal axis XX'.

The two circular profiles C1 and C2 are connected together in projection on a plane perpendicular to the longitudinal axis XX' by a third circular profile C3 of concave side opposite to that of the circular profile C1 and having a radius that is greater than the radius of the circular profile C2.

The profile of the surface of the first wall situated facing the feed tube is extended downstream from the circular profile C2 by a profile L1 that is substantially rectilinear in projection on a plane perpendicular to the longitudinal axis XX'.

The substantially rectilinear profile L1 is inclined relative to the alignment axis YY' of the tubes at an angle lying in the range 28° to 32°.

The substantially rectilinear profile L1 is extended downstream by another substantially rectilinear profile L2 parallel to the substantially rectilinear profile of the opposite wall.

Advantageously, the wall that has the shaped surface masks the measurement chamber from the flow of liquid situated in the feed tube.

The two slots are symmetrical to each other about a plane perpendicular to the alignment axis of the tubes and containing the longitudinal axis XX'.

In a variant of the invention, two slots are placed facing the liquid feed tube, one of said slots, referred to as a "first" slot, offering the flow of liquid a shaped surface that progressively increases the speed of said flow. For example, the two slots are separated from each other by a shaped wall placed facing the liquid feed tube. The second slot may possess a wall which is furthest from the shaped surface of the first slot and which presents a concave profile in projection on a plane perpendicular to the longitudinal axis XX'.

BRIEF DESCRIPTION OF THE DRAWINGS

Other characteristics and advantages appear from the following description given by way of non-limiting example and made with reference to the accompanying drawings, in which.

MORE DETAILED DESCRIPTION

Figure 2:
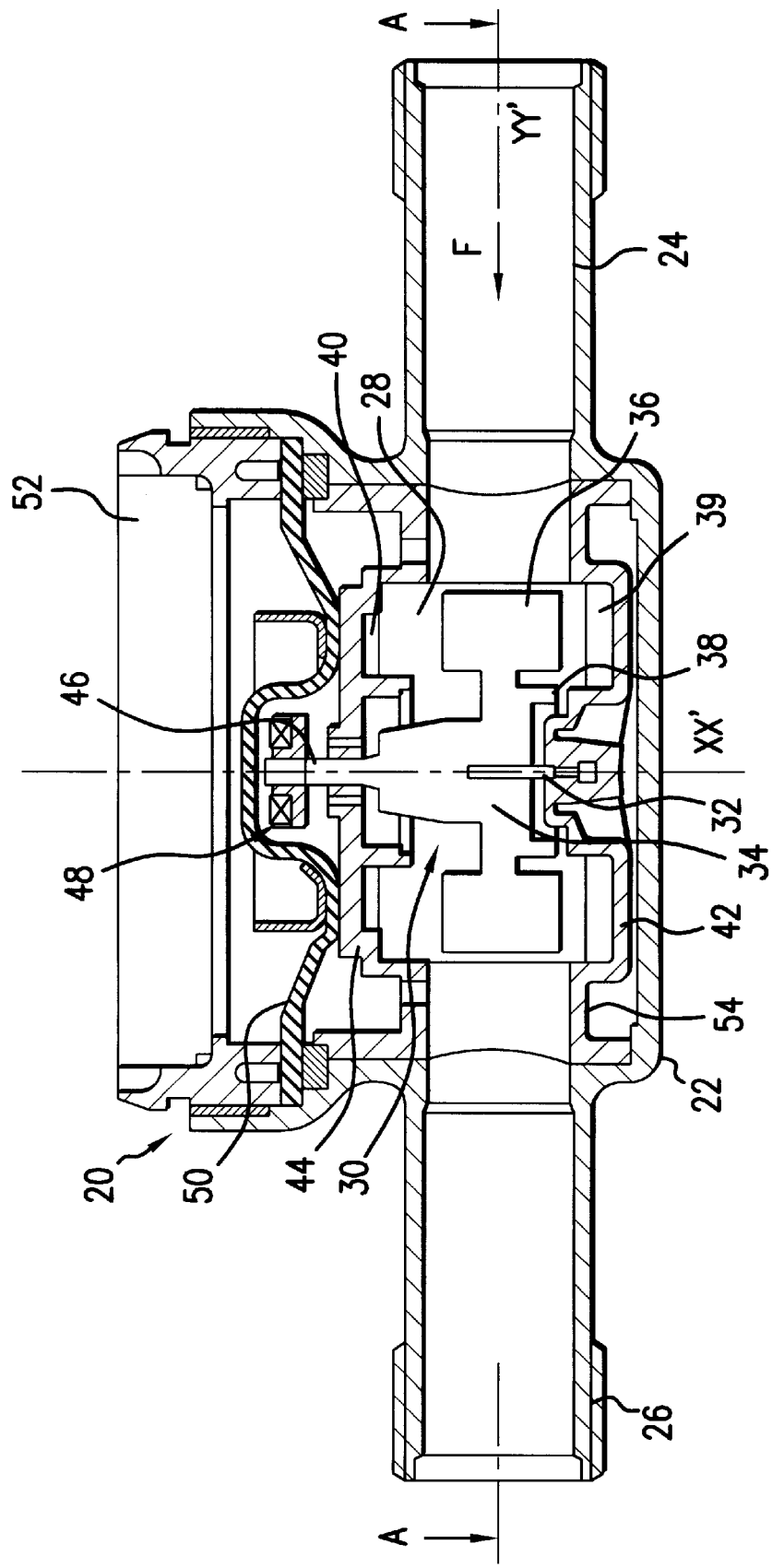
FIG. 2 is a diagrammatic view of a water meter comprising an embodiment of the invention shown in section in a plane containing the longitudinal axis XX' of the spinner and the alignment axis of the tubes, and in which the wall of each slot has been omitted.

As shown in FIG. 2 and given overall reference 20, a single-jet water meter comprises a body 22 referred to below as the "bowl" of the meter which is generally made of brass and has two tubes 24 and 26 connected thereto respectively for feeding water to the meter along arrow F and for discharging it therefrom. Inside the meter bowl there is a measurement chamber 28 in which an axial spinner 30 is mounted to rotate about a pivot 32 having a longitudinal axis XX'. The axial spinner comprises a central hub 34 having a plurality of regularly spaced apart blades 36 attached thereto, e.g. nine blades. A collar 38 is secured to the bottom end of the hub 34 and extends parallel to the longitudinal axis XX'. The function of the collar is to facilitate lifting of the axial spinner 30 at high flow rates, e.g. greater than 200 liters per hour (l/h) so as to avoid damaging the tip of the pivot 32 which contributes to imparting sensitivity to the meter at low flow rates. Asymmetrical radial ribs 39 and 40 are secured respectively to the two opposite end walls 42 and 44 of the measurement chamber.

The top end of the axial spinner 30 carries a shaft 46 which is fitted with a moving magnet carrier 48 constituting the driving portion of the magnetic drive system of the meter. The driven portion of the magnetic drive system of the meter is situated above the wall 50 in the totalizer 52 which is not shown herein, in order to clarify the description.

Figure 3:
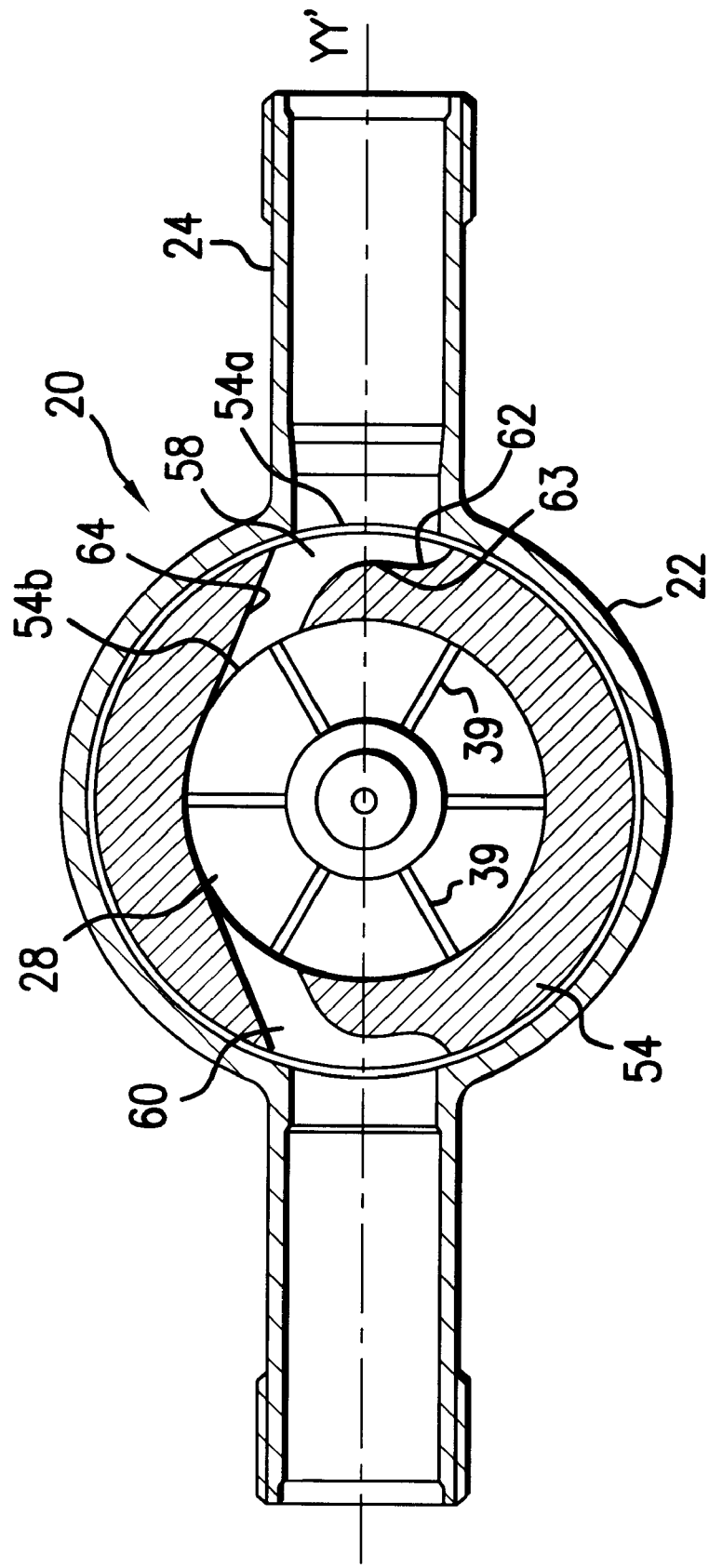
FIG. 3 is a diagrammatic view of the FIG. 2 water meter as seen along arrow A and from which the axial spinner has been omitted.

A housing 54 molded out of plastics material is fitted in the bowl around the axial spinner 30. This housing is referred to as the "injection box" and it possesses a thick wall that is generally cylindrical in shape, as shown in FIG. 3, together with a bottom portion that comprises the end wall 42 of the measurement chamber 28. The part 44 forming the opposite end wall of the measurement chamber (FIG. 2), also referred to as the "top plate", is not a portion of the injection box 54. This part 44 includes a bearing in which the shaft 46 rotates.

As shown in FIG. 3, the injection box has two slots 58 and 60 disposed respectively facing the water feed tube 24 and the water discharge tube 26. The tubes 24 and 26 are in mutual alignment on an axis YY' that intersects the longitudinal axis XX' of the spinner 30 perpendicularly.

The slots 58 and 60 are respectively called the "injector" and the "ejector". The injector 58 deflects the flow of water coming from the tube 24 so as to bring it to the periphery of the spinner, whereas the ejector 60 takes water situated at the periphery of the spinner to discharge it into the tube 26. As shown in FIG. 3, the injector 58 has a shaped surface 62 whose function is to increase progressively the flow speed of the water coming from the feed tube 24. This shaped surface 62 is situated facing the water feed tube 24 in such a manner as to lie on the path of the flow. The shaped surface is constituted mainly by two curve portions with oppositely-directed concave sides. The curve portion close to the feed tube 24 is concave.

Figure 3A:
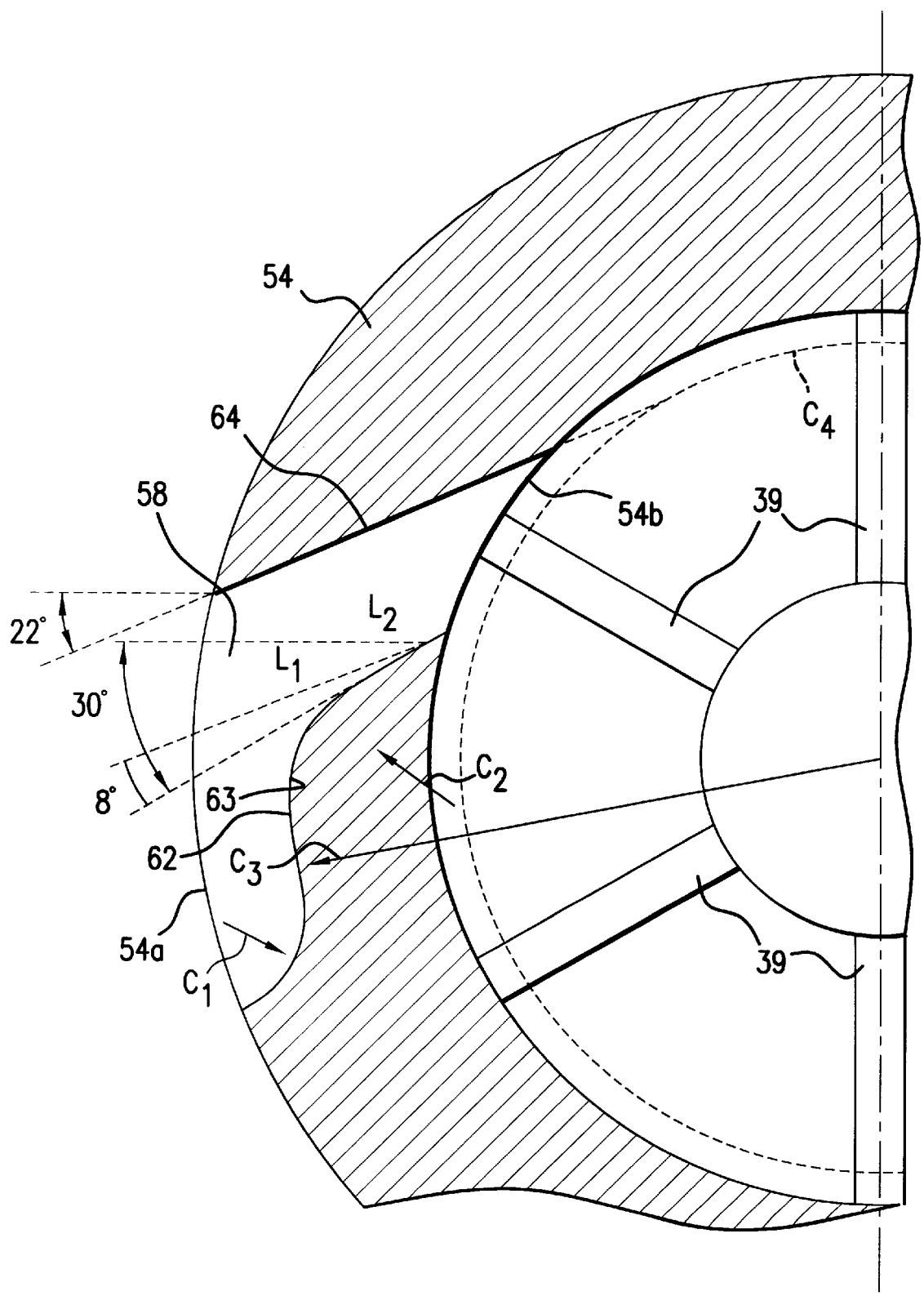
FIG. 3a is a diagrammatic view on a larger scale of the injector of the FIG. 3 water meter, but in which the position of the injector is inverted relative to that of FIG. 3.

In the configuration shown in FIGS. 3 and 3a, the slot 58 has a local flow section that is rectangular and it possesses two opposite walls 63 and 64 which define the larger dimension of said slot extending parallel to the longitudinal axis XX' and referred to as "height". The second wall 64 guides the flow as accelerated by the first wall in an appropriate direction. It should be observed that the slot 58 does not necessarily have a flow section that is rectangular in shape: it is also possible to provide a slot that is more complex with all of its inside surface being shaped to increase progressively the flow speed of the water.

The injector 58 has the shape shown in FIGS. 3 and 3a for simplification purposes, and as a result the feed tube 24 which is cylindrical in shape and the injector 58 do not match exactly. The height of the injector 58 is substantially equal to the inside diameter of the feed tube 24, but the dimension of the slot extending perpendicularly to the longitudinal axis XX' in the plane of FIG. 3, which dimension is called "width", is greater than the inside diameter of said tube.

As shown in FIG. 3a and starting from the feed tube 24, the shaped surface 62 comprises a curve portion which has a circular profile C1 in projection on the plane of FIG. 3a, with the center thereof being situated on the outside edge 54a of the injection box 54. The shaped surface 62 also has a second curve portion which has a convex circular profile C2 in projection on the plane of FIG. 3a of radius greater than that of the circular profile C1. These two circular profiles with oppositely-directed concave sides form the major portion of the shaped surface. The second circular profile C2 enables the flow of water to be accelerated progressively. The two profiles C1 and C2 are connected to each other by a third circular profile C3 that is also convex but whose center is situated on the axis XX' of the spinner so it has a radius that is very much greater than that of the circular profile C2. The circular profile C3 is parallel to the outside edge 54a of the injection box 54.

Downstream from the circular profile C2, the shaped surface 62 is extended by a profile L1 that is substantially rectilinear in projection on the plane of FIG. 3a. The profile L1 is inclined relative to the alignment axis of the tubes at an angle lying in the range 28° to 32°, and equal to 30°, for example. The profile L1 serves to cause the water flow to be converge. It should be observed that the center of the circular profile C2 is determined by its radius and by the need to connect with the profiles C3 and L1. Downstream from this profile, another substantially rectilinear profile L2 runs on to the inside edge 54b of the injection box 54.

In projection on the plane of FIG. 3a, the second wall 64 is substantially rectilinear in profile. It should be observed that this profile could also be concave. The substantially rectilinear profile of the wall 64 is inclined relative to the alignment axis YY' of the tubes at an angle lying in the range 19° to 24°, and is equal to 22°, for example.

When this profile is extended geometrically towards the measurement chamber 28, it is tangential to a circle C4 centered on the axis XX' and of diameter smaller than the circle described by the ends of the blades 36 of the spinner 30. This characteristic imparts good measurement repeatability to the water meter.

The profile L2 of the first wall 63 is parallel to the rectilinear profile of the second wall 64 so as to reduce deformation of the jet as a function of flow rate at the inlet to the measurement chamber. In addition, the wall 63 of the slot 58 is disposed so as to mask the measurement chamber from the flow of water coming from the water feed tube 24. This disposition avoids water flowing directly from the tube towards the measurement chamber without being affected by the shaped surface 62. Such direct flow would have the consequence of lowering the error curve at high flow rates and therefore of increasing the error of measurements performed at such flow rates.

Advantageously, the height of the injector 58 is greater than the height of the blades 36 of the axial spinner 30, thereby making it possible to take advantage of the laminar shear effect in the jet of water leaving said injector, and thus improving the driving torque at low flow rates.

Preferably, when it is desired to obtain the same metering performance whether counting up or down (i.e. flow of water coming from the discharge tube 26), the injector 58 and the ejector are symmetrical to each other about a plane perpendicular to the alignment axis YY' of the tubes and containing the longitudinal axis XX'.

Figure 3B:
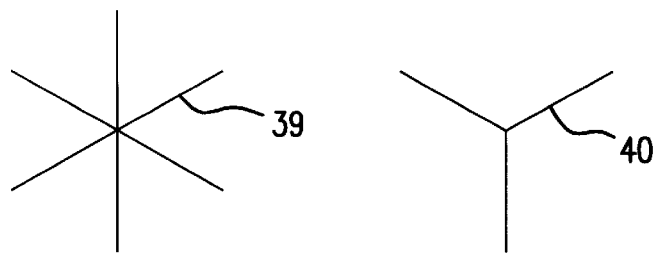
FIG. 3b is a diagrammatic view showing respectively the positions of the bottom ribs 39 and the positions of the top ribs 40.

There are six ribs 39 fixed to the wall 42, whereas there are only three ribs 40 fixed to the wall 44. The ribs 39 are regularly spaced apart, as are the ribs 40. The three top ribs 40 form a "Y" with the two top branches being disposed to face the slots 58 and 60, while the bottom branch is disposed in the plane perpendicular to the axis YY' and containing the axis XX' (FIG. 3b). This particular configuration imparts good sensitivity to the water meter.

The six bottom ribs 39 are disposed in such a manner that two ribs lying on the same straight line are in alignment with the plane perpendicular to the axis YY' and containing the axis XX' (FIG. 3 and FIG. 3a). The two top ribs 40 which form the two upper branches of the Y-shape are superposed over two bottom ribs 39 disposed facing the slots 58 and 60 (FIG. 3b). The fact of superposing the three top ribs 40 over the six bottom ribs 39 makes it possible to increase the impulse transmitted by the flow of water in the measurement chamber 28 to the spinner and thus to increase the driving torque transmitted to said spinner.

Figure 1:
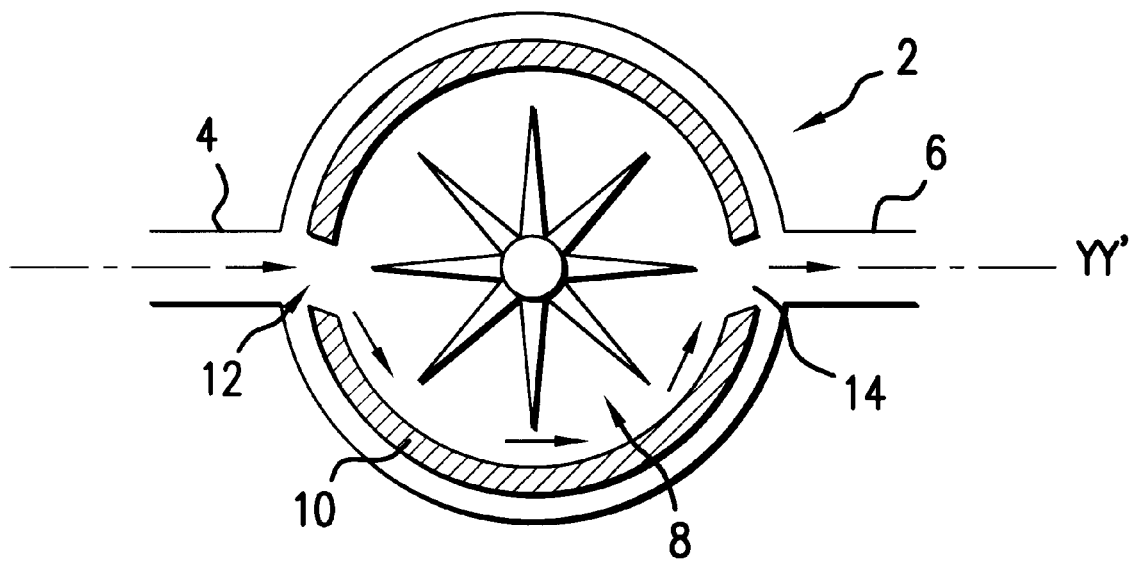
FIG. 1 is a diagrammatic view of a prior art single-jet water meter in section in a plane perpendicular to the longitudinal axis of the spinner of said meter.

The straightening of the error curve at high flow rates is obtained mainly by the way in which the top and bottom ribs are disposed. It should be observed that the way in which the bottom and top ribs are disposed in the measurement chamber relative to the injector and the ejector would apply equally well to a water meter having an injection box with an injector and an ejector of conventional shape as shown in FIG. 1, or even in a more conventional water meter having offset tubes. In both of those cases it would serve to improve meter sensitivity at low flow rates.

Figure 3C:
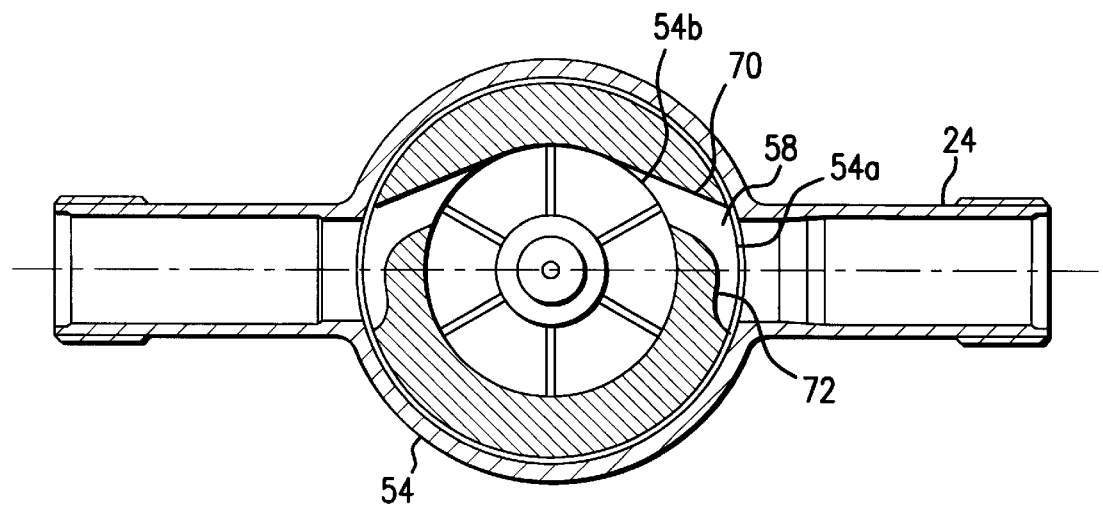
FIG. 3c is a diagrammatic view of a first variant embodiment of the invention analogous to the view shown in FIG. 3.

FIG. 3c shows a variant embodiment in which the profile of the second wall 70, when projected onto the plane of the figure, is not rectilinear but is concave. As a function of this profile, the profile of the first wall 72 is altered so that the distance between the feed tube 24 and the shaped surface of the first wall 72 which meets the flow of water is greater than the corresponding distance shown for the meter of FIG. 3. This surface configuration for the first wall makes it possible to accelerate the flow of water coming from the feed tube 24 more progressively than In the water meter shown in FIG. 3.

It should be observed that this form of injector gives rise to less headloss than that shown in FIG. 3 for the same outlet section at the inside diameter 54b of the injection box.

With the exception of the profile of the second wall, and the numerical values relating to the profile of the first wall, the entire description given above with reference to FIGS. 2, 3, 3a, and 3b applies likewise to this variant embodiment.

Figure 3D:
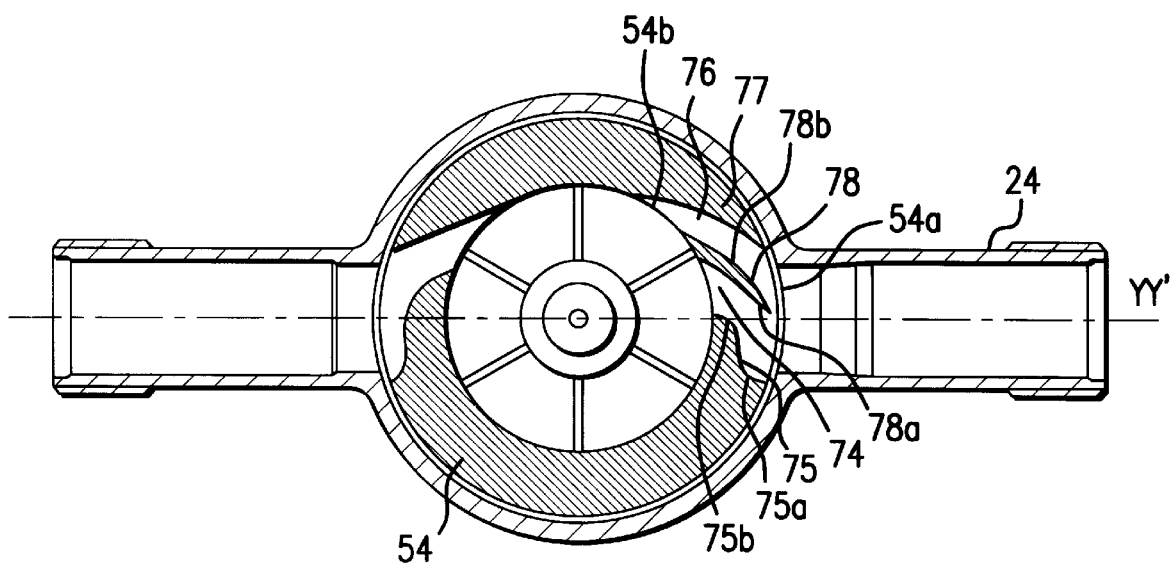
FIG. 3d is a diagrammatic view of a second variant embodiment of the invention analogous to the view shown in FIG. 3.

In another variant as shown in FIG. 3d, two slots 74 and 76 are provided in the injection box 54 of the water meter facing the water feed tube 24 so as to form two injectors. These two slots 74 and 76 are separated from each other by a shaped wall 78 forming a deflector and disposed facing the flow of water coming from the feed tube 24. In this figure, the shaped deflector 78 extends from the inside diameter 54b of the injection box 54 towards the feed tube 24, and it terminates close to the outside diameter of said injection box. Nevertheless, it is possible to envisage a configuration in which the deflector extends from the inside diameter 54b to the outside diameter 54a of the injection box 54.

As shown in FIG. 3d, the first slot 74 presents a shaped surface 75 to the water coming from the feed tube 24 that progressively increases the speed of said flow and that is constituted mainly by a concave first portion 75a and a convex second portion 75b that are altered relative to the shape of the shaped surface 62 of FIG. 3 so as to enable the water flow to be accelerated more progressively. It should be observed that the distance between the feed tube 24 and the shaped surface 75 of the first slot 74 is greater than the same distance shown for the meter of FIG. 3. The shaped surface 75 of the first slot 74 co-operates with a wall 78a of the shaped deflector 78 placed facing said shaped surface. The wall 78a of the deflector 78 serves to guide the liquid flow that is progressively accelerated by the shaped surface 75. In addition, the second slot 76 has a wall 77 facing the shaped deflector 78 and further away from the shaped surface 75 of the first slot 74. In projection onto the plane of FIG. 3d which is perpendicular to the longitudinal axis XX', the wall 77 has a concave profile which co-operates with the wall 78b of the facing shaped profile 78 for the purpose of progressively accelerating the flow of water coming from the feed tube 24.

Figure 5:
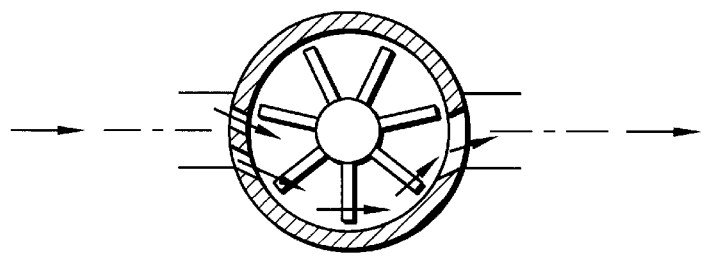
FIG. 5 is a diagrammatic view of a prior art water meter in section in a plane perpendicular to the longitudinal axis of the spinner of such a meter.

By way of example, the disposition of FIG. 3d can be useful in improving the driving torque that can be transmitted by the water meter at low flow rates compared with prior art meters, and in particular that of FIG. 5, when the bore size of said meter is increased. This variant embodiment may include the other characteristics described with reference to FIGS. 2, 3, 3a, and 3b, with the exception of the characteristics relating to the shape of the second wall 64 and the numerical values relating to the first wall 63 and to the second wall 64.

By way of numerical example, the measurement chamber 28 has an inside diameter of 45 mm, the housing 54 has a thickness of 12 mm, the blades 36 of the spinner 30 have a height of 14 mm, the top ribs 40 have a height of 2 mm, a width of 2.5 mm, and a length of 9.5 mm, and the bottom ribs 39 have a height of 4 mm, a width of 1.5 mm, and a length of 13 mm. The slots 58 and 60 have a height of 17 mm, a width where they connect to the tubes 24 and 26 of 21 mm, and a width where they open out into the measurement chamber of 6.5 mm. The profiles C1, C2, and C3 of the shaped surface 62 have radiuses respectively equal to 5 mm, 8 mm, and 29.5 mm. The profiles L1 and L2 have respective lengths of 3.5 mm and 1 mm.

Figure 4:
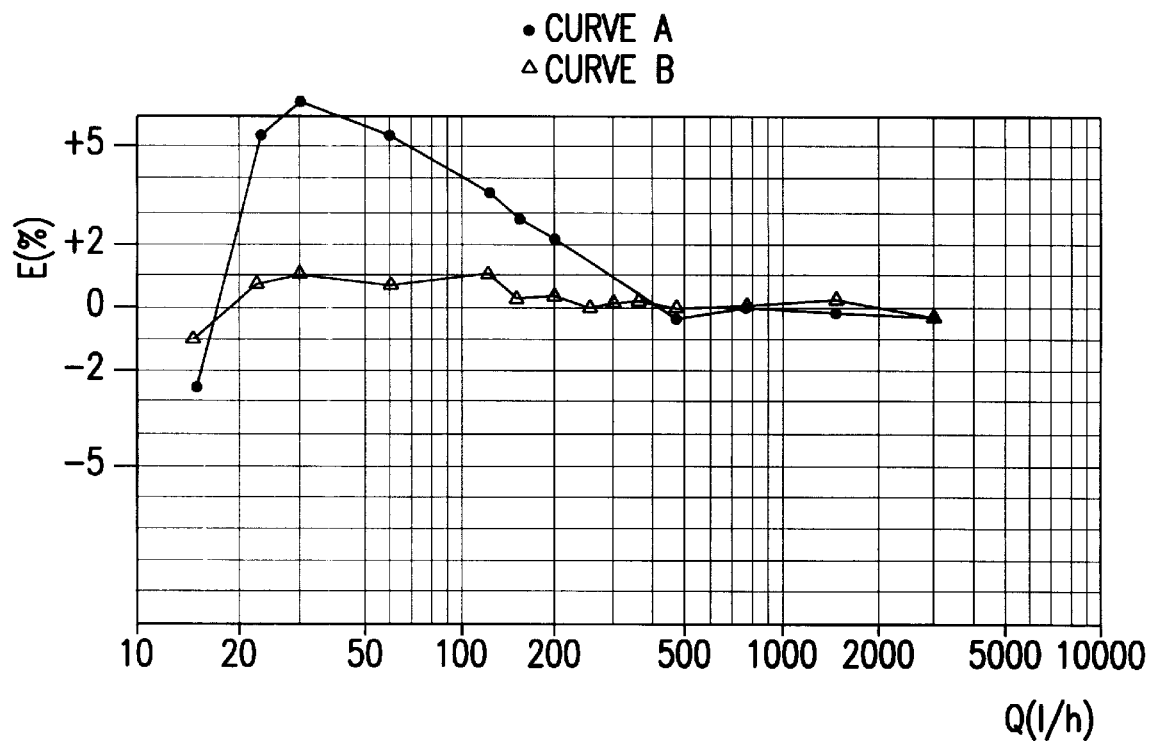
FIG. 4 shows two relative error curves as a function of measured flow rate as obtained respectively for a prior art water meter (curve A) and for a water meter of the invention (curve B).

FIG. 4 gives two curves representing relative error in the measurements performed by two water meters as a function of the flow rate passing through each meter. The meters were placed in a position such that the axis of the spinner was vertical. The authorized limits on error for a class C meter are shown by continuous lines in the figure.

Curve A was obtained using a prior art water meter as shown in FIG. 5. Such a meter has liquid feed and discharge tubes that are in alignment with each other and whose alignment axis YY' intersects the longitudinal axis XX' of the spinner perpendicularly. The injection box is disposed in the meter bowl around the periphery of the spinner and includes two slots placed facing the liquid feed tube and one, wider slot placed facing the liquid discharge tube. Each of these slots is inclined symmetrically relative to the alignment axis YY' of the tubes. The injection box has a wall thickness of 4.5 mm, an inside diameter of 48.8 mm, and the slots are 13 mm high. Four regularly spaced apart bottom ribs are disposed in the bottom portion of the measurement chamber. The spinner has seven blades that are 12 mm high. The outside diameter of the spinner fitted with the blades is 45.5 mm. Two top ribs are disposed in the top portion of the measurement chamber on the top plate. The meter is provided with magnetic drive operating by face-to-face type attraction, with each of the magnets being implemented in the form of a ring.

Curve B was obtained with a water meter of the invention, and more precisely with the meter shown in FIGS. 2 and 3.

It can thus be seven that the water meter of the invention provides a very clear improvement in the driving torque transmitted to the spinner at low flow rates, thereby making it possible to compensate for the interfering torque due to the magnetic drive, and thus making it possible to obtain better metering accuracy, regardless of the position of the spinner axis.

Advantageously, the injection box 54, the axial spinner 30, and the top plate 44 constitute a modular assembly which can be installed in a water meter bowl 22 of appropriate dimensions.

What is claimed is:

1. A single-jet liquid meter comprising a body in which a measurement chamber of substantially cylindrical shape is disposed, the chamber being fitted with a spinner having a longitudinal axis XX' and provided with blades, the spinner being mounted free to rotate about a pivot, each blade extending from the pivot to an end of the blade, a liquid feed tube and a liquid discharge tube connected to said body and in alignment on an axis YY' that intersects said axis XX' perpendicularly, a housing disposed in said body around the periphery of the spinner and including at least two slots respectively placed facing the feed tube and the discharge tube, said slots being designed to inject and eject the liquid flow in inclined manner relative to the alignment axis of the tubes, wherein at least one slot is placed facing the feed tube and offers to the flow of liquid coming from said tube a shaped surface that progressively increases the speed of said flow, said shaped surface belonging to a first wall of the slot which is situated facing the feed tube, a second wall of said slot facing the first wall and guiding the flow of liquid progressively accelerated by said shaped surface.

2. A meter according to claim 1, in which the profile of the surface is mainly constituted by two curved portions having oppositely-directed concave sides.

3. A meter according to claim 2, in which the curved portion closer to the feed tube is concave.

4. A meter according to claim 1, in which the slots have a local flow passage that is rectangular, with the larger dimension thereof extending parallel to the longitudinal axis XX'.

5. A meter according to claim 4, in which the dimension of the slot that extends perpendicularly to the longitudinal axis XX' in a plane perpendicular to the alignment axis YY' of the tubes is greater in size than the inside diameter of the feed tube in its portion closest to said tube.

6. A meter according to claim 1, in which the second wall presents a profile that is substantially rectilinear in projection on a plane perpendicular to the longitudinal axis XX'.

7. A meter according to claim 6, in which the substantially rectilinear profile of the second wall, when geometrically extended towards the measurement chamber, is tangential to a circle C4 of diameter smaller than that of a circle defined by ends of the blades of the spinner.

8. A meter according to claim 6, in which the substantially rectilinear profile of the second wall is inclined relative to the alignment axis YY' of the tubes at an angle lying in the range 19° to 24°.

9. A meter according to claim 1, in which the second wall presents a concave profile in projection on a plane perpendicular to the longitudinal axis XX'.

10. A meter according to claim 9, in which the largest dimension of the slot is substantially equal to the inside diameter of the feed tube.

11. A meter according to claim 1, in which the first wall has a curved portion that is closer to the feed tube presenting a circular profile C1 in projection on a plane perpendicular to the longitudinal axis XX'.

12. A meter according to claim 11, in which the curved portion of concave side that is oppositely directed to the portion that is closer to the feed tube presents a circular profile C2 of larger radius than C1 in projection on a plane perpendicular to the longitudinal axis XX'.

13. A meter according to claim 12, in which the two circular profiles C1 and C2 are connected together in projection on a plane perpendicular to the longitudinal axis XX' by a third circular profile C3 of concave side opposite to that of the circular profile C1 and having a radius that is greater than the radius of the circular profile C2.

14. A meter according to claim 12, in which the profile of the surface of the first wall situated facing the feed tube is extended downstream from the circular profile C2 by a profile L1 that is substantially rectilinear in projection on a plane perpendicular to the longitudinal axis XX'.

15. A meter according to claim 14, in which the substantially rectilinear profile L1 is inclined relative to the alignment axis YY' of the tubes at an angle lying in the range 28° to 32°.

16. A meter according to claim 15, in which the second wall presents a profile that is substantially rectilinear in projection on a plane perpendicular to the longitudinal axis XX', and in which the substantially rectilinear profile L1 is extended downstream by another substantially rectilinear profile L2 parallel to the substantially rectilinear profile of the opposite wall.

17. A meter according to claim 1, in which the first wall that has the shaped surface masks the measurement chamber from the flow of liquid situated in the feed tube.

18. A meter according to claim 1, in which the greatest dimension of the slot is greater than the dimension of the blades of the spinner extending in the same direction.

19. A meter according to claim 1, in which the housing has a thick wall that is generally substantially cylindrical in shape.

20. A meter according to claim 1, in which the two slots are symmetrical to each other about a plane perpendicular to the alignment axis YY' of the tubes and containing the longitudinal axis XX'.

21. A meter according to claim 1, in which the two slots are separated from each other by a shaped wall placed facing the liquid feed tube.

22. A meter according to claim 21, in which the first slot has a local flow passage that is rectangular, with the larger dimension thereof extending parallel to the longitudinal axis XX', and in which the second slot possesses a wall which is furthest from the shaped surface of the first slot and which presents a concave profile in projection on a plane perpendicular to the longitudinal axis XX'.

* * * * *